United States Patent [19]  
Dezawa et al.

[11] 4,125,474  
[45] Nov. 14, 1978

[54] PROCESS FOR PRODUCING FERROGMAGNETIC IRON OXIDE POWDER COMPRISING A PRE-TREATMENT WITH A REDUCING AGENT

[75] Inventors: Shin-Ichiro Dezawa; Koji Sasazawa; Tatsuji Kitamoto; Nobuo Yamazaki, all of Kanagawa, Japan

[73] Assignee: Fuji Photo Film Co., Ltd., Minami Ashigara, Japan

[21] Appl. No.: 710,813

[22] Filed: Aug. 2, 1976

[30] Foreign Application Priority Data

Aug. 1, 1975 [JP] Japan ................................. 50-93828

[51] Int. Cl.² ..................... C01G 49/06; C01G 49/08
[52] U.S. Cl. .............................. 252/62.62; 252/62.56; 427/127
[58] Field of Search ......................... 252/62.56, 62.62; 427/127; 423/633, 634

[56] References Cited

U.S. PATENT DOCUMENTS 3,075,919  1/1963  Gruber et al. .................... 252/62.56
3,243,375  3/1966  Jeschke ............................ 252/62.56
3,725,126  4/1973  Haller et al. ................. 252/62.56 X

FOREIGN PATENT DOCUMENTS 2,036,612  2/1971  Fed. Rep. of Germany ........ 252/62.56
2,235,383  2/1973  Fed. Rep. of Germany ........ 252/62.56
2,413,430 10/1974  Fed. Rep. of Germany ........ 252/62.56

OTHER PUBLICATIONS

Umeki, "Chem. Abstracts", vol. 82, 1975, 79751v

*Primary Examiner*—Jack Cooper  
*Attorney, Agent, or Firm*—Sughrue, Rothwell, Mion, Zinn and Macpeak

[57] ABSTRACT

In a process for producing a ferromagnetic powder having a high coercive force which comprises adding an aqueous solution containing $Co^{+2}$ ions, or both $Co^{+2}$ ions and another cation(s), and an alkali solution to a suspension of a ferromagnetic iron oxide containing the metal(s) given by these ion(s), the improvement wherein said ferromagnetic iron oxide is treated with a reducing agent prior to the preparation of the suspension.

14 Claims, No Drawings

PROCESS FOR PRODUCING FERROGMAGNETIC IRON OXIDE POWDER COMPRISING A PRE-TREATMENT WITH A REDUCING AGENT

BACKGROUND OF THE INVENTION

1. Field of the Invention

This invention relates to a ferromagnetic iron oxide powder for magnetic recording, specifically, to a ferromagnetic iron oxide powder having high coercive force and improved stability to pressure and heat.

2. Description of the Prior Art

Ferromagnetic iron oxides for magnetic recording are required to have high coercive force and exhibit superior orientability.

One effective means of increasing the coercive force of a ferromagnetic iron oxide powder involves incorporating cobalt ions in iron oxide to form a solid solution, and various methods of this type are suggested, for example, in U.S. Pat. Nos. 3,117,933 and 3,671,435, Japanese Patent Application (Laid Open) No. 101599/73, and Japanese Patent Publication Nos. 6538/66, 4264/74, 27719/66 (corresponding to U.S. Pat. No. 3,573,980), 15759/73, 10994/73 and 6113/67. Magnetic recording media, such as magnetic tapes, made by using the cobalt-containing iron oxides produced by such methods, however, have the defect that they are unstable to pressure and heat, and the magnetic signals recorded become weak or are transferred to a great extent.

Another method for increasing coercive force comprises adhering a layer of a cobalt compound or cobalt ferrite to the surface of magnetic iron oxide powder free from cobalt in the form of a solid solution, or growing such layer on the surface thereof, and such is specifically disclosed, for example, in Japanese Patent Application (Laid Open) Nos. 108599/74, 37667/75 and 37668/75 and Japanese Patent Publication No. 49475/74. Ferromagnetic iron oxide powders obtained by these methods are stable to pressure and heat and have improved transfer characteristics as compared with those obtained by dissolving cobalt.

On the other hand, Japanese Patent Application (Laid Open) Nos. 22707/72, 1998/73, 51297/73, 54497/73, 58398/73, 76097/73, and 87397/73, Japanese Patent Publication No. 20557/75 disclose a method in which cobalt or at least one other metal is adhered onto ferromagnetic iron oxide dispersed in water, in the presence of a reducing agent. This method is designed to reduce metal ions such as cobalt to cause them to adhere to the ferromagnetic iron oxide. Such a method is different from the present invention wherein ferromagnetic iron is reduced, and then, in the absence of the reducing agent, a metal ion such as cobalt is added.

Japanese Patent Publication No. 17,113/64 discloses that a Co-doped iron oxide cooled in a magnetic field can be treated with a solution of sodium borohydride. Since this treatment is carried out after cobalt doping, and is intended to fix the magnetic field cooling effect, it is clear that the present invention differs from this prior invention.

The method comprising adhering a cobalt compound to the surface of a ferromagnetic iron oxide not containing cobalt can provide a product having a coercive force of about 500 to 600 Oe at the highest. On the other hand, according to the method involving growing a cobalt ferrite layer, the coercive force of the resulting product is nearly proportional to the cobalt ferrite layer grown on the surface. The cobalt ferrite layer is a magnetic oxide in which cobalt is dissolved to form a solid solution, and is unstable to pressure and heat. For this reason, this defect of the cobalt ferrite layer grown on the surface is gradually exhibited, and this method cannot provide a ferromagnetic iron oxide powder having high coercive force and improved stability to pressure and heat.

Iron oxide having a high coercive force obtained only by a precipitation reaction in aqueous solution has better thermal stability and more stable properties with the passage of time, for example, SP ratio, than cobalt-containing iron oxide produced from cobalt-containing goethite, or ferromagnetic iron oxide contained by adhering cobalt to iron oxide and heat-treating it at a temperature as high as 300° to 500° C to thereby diffuse the cobalt and increase the coercive force. Furthermore, since it can be produced by a simple process step, it is suitable for commercial production.

The coercive force, however, does not increase proportionately to the increased amount of cobalt added, and it is extremely difficult to raise the coercive force beyond 500 to 600 Oe. Thus, the coercive force of such a ferromagnetic iron oxide is not entirely sufficient for use in high density recording magnetic tapes. The present invention relates to an improvement in the above-described method of reaction in an aqueous solution, and insures the production of ferromagnetic iron oxide having good magnetic stability and high coercive force.

SUMMARY OF THE INVENTION

It is an object of this invention to provide a ferromagnetic iron oxide powder for magnetic recording having high coercive force, improved stability to heat and pressure, improved transfer characteristics, reduced changes with time of the coercive force, and a narrowed coercive force distribution which is capable of providing magnetic tapes with an improved SP ratio (print-through ratio) and erasure characteristics.

In particular, the invention relates to an improvement in a process for increasing the coercive force of ferromagnetic iron oxide powder by precipitating a cobalt-containing compound in solution, disclosed in, for example, Japanese Patent Application (Laid-Open) Nos. 108,599/74, 37,667/75 and 37,668/75, which is to the same effect as in the method of precipitating ferrite on acicular particles as disclosed in Japanese Patent Publications 5515/61 and 4825/62.

According to the present invention, there is provided a process for producing a ferromagnetic powder having high coercive force which comprises adding an aqueous solution containing $Co^{+2}$ ions, or both $Co^{+2}$ ions and one or more other cations, and an alkali solution to a suspension of ferromagnetic iron oxide, and heating the mixture to form ferromagnetic iron oxide containing the metal or metals provided by such an ion or ions, where a reducing agent is added after preparing the suspension of ferromagnetic iron oxide but before adding the $Co^{+2}$ ion (or $Co^{+2}$ ion and one or more other cations) containing solution.

DETAILED DESCRIPTION OF THE INVENTION

The ferromagnetic iron oxide used in this invention includes, for example, maghemite ($\gamma$-$Fe_2O_3$; $FeO_x$, $x = 1.50$), magnetite ($Fe_3O_4$; $FeO_x$, $x = 1.33$), Berthollide iron oxides (iron oxides having a degree of oxidation intermediate maghemite and magnetite; $FeO_x$ in which 1.33 < x < 1.50), and partly oxidized metallic iron, most preferably such iron where the average composition is such that, if represented by the formula $FeO_x$, $x$ is greater than about 0.5. These iron oxides have an acicular ratio of about 2/1 to about 20/1, preferably 4/1 to 12/1, and an average particle length of about 0.3 to about 1.5 μm, preferably 0.4 to 1 μm. Maghemite and magnetite usually have a coercive force (Hc) of about 250 to 450 Oe. The Berthollide iron oxides obtained by oxidizing magnetite or reducing maghemite can be represented as approximately $FeO_{1.35}$; such have a coercive force about 30 Oe greater than maghemite or magnetite. The above described iron oxides wherein $x$ is 1.33 < x < 1.50 are preferably used in this invention. It is to be noted, in this regard, that the proportion of ferromagnetic iron oxide in the system is not overly important, with exemplary proportions being given in the Examples.

Berthollide iron oxide is described, for example, in Japanese Patent Publication Nos. 5007/64, 10307/64, and 39639/73.

The treatment with a reducing agent is carried out by adding the reducing agent to a slurry obtained by dispersing the ferromagnetic acicular iron oxide in water. Conversely, the ferromagnetic acicular iron oxide may be dispersed in an aqueous solution of the reducing agent. The solvent used in this procedure includes not only water but also a mixture of water and a water-miscible organic solvent such as alcohols, or ketones. If used, the water-miscible organic solvent (or solvents) are generally mixed in an amount of at most about 50 wt.% of the water present. Preferred organic solvents include aliphatic alcohols having 1 to 4 carbon atoms such as methanol, ethanol, propanol, isopropanol and butanol; and ketones such as methyl ethyl ketone, diethyl ketone, methyl isobutyl ketone, and acetone.

The concentration, temperature and pH of the slurry are not restricted in particular so long as they are effective for the function of the reducing agent. These conditions should suitably be chosen according to the type of the reducing agent used.

The amount of the reducing agent in the reducing agent solution should be at least 0.5% by weight. In the process of the present invention, the treating time should be at least about 3 minutes, and it is desirable that the treatment be continued until the reducing agent decomposes and losing its reducing power. Seldom will the treating time be more than about 15 hours, and a preferred time range is from 3 minutes to 5 hours, more preferably a treating time of at least 10 minutes and no more than 5 hours. Where the reducing agent is not wholly decomposed but partly remains, it should be removed from the product by washing with water. As earlier indicated, the concentration of the ferromagnetic iron oxide in the slurry is not important from the viewpoint of achieving the effects of the present invention. However, from the viewpoint of efficiently practicing the process of the present invention on an industrial scale, about 5 to about 40 wt.% (based on the slurry weight) is preferred.

It is further preferred to utilize the reducing agent in an amount of from about 0.01 to about 30 wt.%, based on the acicular ferromagnetic iron oxide, even more preferably from 1 to 15 wt.%.

If the amount of the reducing agent(s) is less than the above preferred range, the effects of the present invention are not obtained; on the other hand, if the amount of the reducing agent(s) is in excess of the above preferred range, it is necessary to separate excess reducing agent which is not preferred.

While the process of the present invention can be practiced at sub- or super-atmopsheric pressure, nothing is gained thereby in the sense of increased process efficiency or improved product characteristics, and, accordingly, seldom if ever will the process of the present invention be practiced at other than atmospheric pressure.

The process of the present invention, insofar as the treatment (contact) with the reducing agent is concerned, is conveniently practiced at a temperature of from about room temperature to about 100° C.

Preferred reducing agents are those which have a standard electrode potential of about at highest about −0.4 V, i.e., preferably, about −0.4 V to about −1.6. It is even more preferred that the reducing agents utilized in the process of the present invention have a solubility greater than about 2 g/100 ml in water at 25° C.

Useful reducing agents are, for example, borohydride compounds and derivatives thereof, hypophosphorous acid and hypophosphorous acid (phosphinic acid) salts, hydrazine compounds formic acid, formic acid salts, aldehydes, and derivatives thereof. These reducing agents can be used either alone or as combinations of two or more thereof.

Examples of the borohydride compounds (including dialkylamino boranes) or boranes, borazane, boron hydride, sodium borohydride, potassium borohydride, dimethylaminoborane, and diethylaminoborane.

Hypophosphorous acid and its salts, for example, ammonium salts, alkali metal salts, alkaline earth metal salts and other metal salts, are compounds which yield a hypophosphate (phosphinate) ion $[PH_2O_2]^{31}$. Specific examples of these compounds include hypophosphorous acid, ammonium hypophosphite, sodium hypophosphite, magnesium hypophosphite, aluminum hypophosphite, potassium hypophosphite, calcium hypophosphite, manganese hypophosphite, iron hypophosphite, cobalt hypophosphite, nickel hypophosphite, zinc hypophosphite, barium hypophosphite, cerium hypophosphite, lead hypophosphite, and uranyl hypophosphite. Of these, the ammonium, sodium, magnesium, potassium salt and calcium salt, and hypophosphorous acid are especially suitable.

Examples of the hydrazine compounds are hydrazine hydrochloride, hydrazine sulfate, hydrazine nitrate and hydrazine hydrate.

Formic acid salts include, for example, sodium formate and potassium formate.

Usable aldehydes include aliphatic saturated aldehydes, where preferred aliphatic groups or alkyl groups having from 1 to 4 carbon atoms such as methyl, ethyl, propyl, isopropyl, butyl, etc., such as formaldehyde, acetaldehyde, and propionaldehyde.

As desired or necessary, a complexing agent, a pH buffer, and a pH adjuster, for example, may be added. Examples of the pH buffer and complexing agent include monocarboxylic acids such as formic acid, acetic acid, propionic acid, butyric acid, valeric acid, acrylic acid, trimethylacetic acid, benzoic acid, and chloroacetic acid, and their salts, e.g., the alkali metal salts such as the sodium salt or the potassium salt or the ammonium salt. Examples of the complexing agent also include dicarboxylic acids such as oxalic acid, succinic acid, malonic acid, maleic acid, itaconic acid and p-phthalic acid, and their salts, e.g., the alkali metal salts such as the sodium salt or the potassium salt or the ammonium salt; and hydroxycarboxylic acids much as glycolic acid, lactic acid, salicyclic acid, tartaric acid, or citric acid, and their salts, e.g., the alkali metal salts such as the sodium salt or the potassium salt or the ammonium salt. Boric acid, carbonic acid, and sulfites, for example, can be cited as pH adjusters and pH buffers. Examples of pH adjusters also include other inorganic and organic acids, ammonium, and alkali hydroxides. The above-cited additives not only have their own activities but also other activities. For example, certain compounds act as both a complexing agent and a pH buffer, and the activities of the additives are not limited.

The use of these additives can be omitted when the reducing agent is a borohydride compound.

It is to be specifically noted tht in accordance with the process of the present invention it is not preferred to use a combination of a pretreatment with a reducing agent and a treatment with an oxidizing agent due to the harmful effects which are attained.

The ferromagnetic acicular iron oxide treated with the reducing agent is separated from the reducing agent, or the reducing agent is decomposed until it loses its reducing effect. Then, an aqueous solution of a cobalt salt of an aqueous solution containing cobalt ions and one or more other cations, and an alkali solution is added to the slurry of ferromagnetic iron oxide with contained stirring and the mixture is heated.

Following the treatment with the reducing agent, the conditions of the $Co^{+2}$ ion (with or without another cation(s)) treatment can be varied from the reducing agent treatment conditions, if desired. For example, the addition and contact with the $Co^{+2}$ ions (with or without another cation(s)) is preferably conducted at a temperature of from about 0° to about 100° C, more preferably from room temperature to 70° C, over a period of from about 30 minutes to about 6 hours, even more preferably from 1 to 4 hours. The pressure is not substantially important and can be varied over a very wide range; typically it is atmospheric. The same conditions apply to the alkali addition since, of course, usually these two operations proceed simultaneously or an essentially adjacent process steps.

Most preferably, cobalt is present in the reaction solution in an amount of from about 0.5 to about 10 atomic percent, even more preferably 0.8 to 5 atomic percent, based on the elemental iron in the ferromagnetic iron oxide.

The sequence of addition of the alkali and cobalt is not restricted in particular, and the cobalt solution and the alkali solution may be added portion-wise, if desired. Portion-wise addition has an effect of insuring an uniform precipitation of cobalt, and provides better erasure characteristics at the same coercive force when the resulting ferromagnetic iron oxide is used for magnetic tapes.

The process of this invention is described in greater detail below. First, the starting ferromagnetic iron oxide is dispersed fully in water, and, with stirring, one of the following five steps is performed.

(A) Add an aqueous solution containing $Co^{+2}$ ions with or without another cation(s), and then an aqueous alkali solution.

(B) Add the aqueous alkali solution, and then the aqueous solution containing $Co^{+2}$ ions with or without another cation(s).

(C) Add the aqueous alkali solution in two portions, one before adding the aqueous solution containing $Co^{+2}$ ions with or without another cation(s), and the other thereafter (portion-wise addition).

(D) Add the aqueous alkali solution and then the aqueous solution containing $Co^{+2}$ ions with or without another cation(s) both in at least two portions, and finally add the aqueous alkali solution (repeated portion-wise addition).

(E) Add the aqueous alkali solution first in an amount of 0.7 to 1.4 equivalents, preferably 1 equivalent, into the aqueous solution containing $Co^{+2}$ ions (and other cations, if desired) to neutralize the same, and then add the balance of the aqueous alkali solution.

It is generally most convenient to divide the alkali solution and the $Co^{+2}$, with or without other cation(s), solution into equal portions for each portion-wise addition for the particular solution involved, though, of course, this is not mandatory. Often, when the alkali solution is initially added, the amount used will be 0.7 to 1 time that required to neutralize the $Co^{+2}$ and other cations.

After adding these solutions, they must be homogenized in the suspension of the ferromagnetic powder by thorough stirring. Usually, the stirring is performed for 30 to 60 minutes, but this is not mandatory.

By carrying out precipitation in multiple stages as in methods (C) and (D), uniform precipitation of the Co or other metals can be effected. This serves to increase the coercive force of the ferromagnetic powder and to narrow the coercive force distribution in accordance with this invention. Stirring is carried out by conventional means, for example, a stirrer, ultrasonic vibrations, etc.

By practicing in accordance with the present invention, one can obtain a product illustrating a coercive force of from about 10 to about 100 Oe higher than a product obtained by an otherwise identical process except omitting the reducing agent treatment of the present invention.

The aqueous solution containing $Co^{+2}$ ions with or without one or more other cations is an aqueous solution having dissolved therein water soluble salts of metals yielding such ions. Examples of such other cations include $Cr^{+3}$, $Cr^{+6}$, $Mn^{+2}$, $Fe^{+2}$, $Fe^{+3}$, $Ni^{+2}$ and $Zn^{+2}$. These ions are included in the above mentioned ferromagnetic iron oxides by the process of this invention.

Water soluble cobalt salts are compounds which yield $Co^{+2}$ ions in water, and include, for example, inorganic salts, inorganic acid salts, organic acid salts, halides or complex salts of cobalt. It is most preferred that the solubility in water be greater than 2 g/100 ml of water at 25° C (hereinafter merely g/ml).

Specific examples of such cobalt salts are cobalt inorganic acid salts such as cobalt sulfate, cobalt nitrate, cobalt perchlorate, cobalt hexafluorosilicate, cobalt ammonium sulfate and cobalt ammonium chloride; cobalt halides such as cobalt chloride, cobalt bromide, cobalt fluoride, and cobalt iodide; cobalt organic acid salts such as cobalt acetate, cobalt citrate, cobalt tartrate, and cobalt formate; cobalt complex salts such as hexammine cobalt chloride, hexammine cobalt nitrate, ethylenediamine cobalt chloride and cesium hexafluorocobalt. Of these, the chlorides, sulfates, nitrates, bromides, fluorides, iodides, perchlorates, acetate, benzoates, hexammine chlorides, hexammine nitrate salts, hexammine sulfate salts, aquopentammine chlorides, ethylenediamine chlorides, and ammonium sulfate salts of cobalt are especially suitable.

The amount of the water soluble cobalt salt is about 0.5 to about 10 atomic percent, preferably 0.8 to 5 atomic percent, based on the Fe element of the ferromagnetic iron oxide.

Where $Co^{+2}$ ions are used in combination with another cation or cations, they are added so that the total amount of the water soluble cobalt salt and the water soluble metal salt of the one or more other cations such as $Cr^{+3}$, $Cr^{+6}$, $Mn^{+2}$, $Fe^{+2}$, $Fe^{+3}$, $Ni^{+2}$ or $Zn^{+2}$ becomes about 0.5 to about 10 atomic percent, preferably 0.8 to 5 atomic percent, based on the Fe element of the ferromagnetic iron oxide. The ratio between the $Co^{+2}$ ions and the other cation(s) is such that the proportion of the $Co^{+2}$ ion is at least 1/3 based on the above atomic percent, and the proportion of the other cation(s) is not more than 2/3, based on the above atomic percent.

Water soluble chromium salts are compounds which yield $Cr^{+3}$ or $Cr^{+6}$ ions in water. Such chromium salts preferably have a water solubility greater than 2 g/100 ml at 25° C. They include inorganic acid salts, organic acid salts, chromium halides and metal or ammonium salts of chromates and dichromates, etc.

Specific examples of such chromium salts are chromium inorganic acid salts such as chromium nitrate, chromium sulfate, chromium thiocyanate, chromium potassium sulfate and chromium sulfate; chromium organic acid salts such as chromium acetate; chromium halides such as chromium chloride, chromium bromide, chromium fluoride and chromium iodide; and chromates or dichromates such as chromyl chloride,, chromyl fluoride, ammonium chromate, sodium chromate, potassium chromate, ammonium dichromate, sodium dichromate and potassium dichromate.

Where it is desired to form hydroxides, the use of water soluble Cr (III) salts is desirable.

Water soluble manganese salts are compounds which yield $Mn^{+2}$ ions in water. Such manganese salts preferably have a water solubility greater than 2 g/100 ml at 25° C.

Specific examples of such manganese salts are manganese inorganic acid salts such as manganese sulfate, manganese nitrate, manganese hypophosphite, manganese ferrocyanide, manganese ferricyanide, manganese potassium chloride, manganese thiocyanate, manganese pyrophosphate, manganese hydrogen phosphate, manganese phosphite and manganese ammonium sulfate; manganese organic acid salts such as manganese formate, manganese acetate, manganese benzoate, manganese cyclohexanebutyrate, manganese butyrate, manganese lactate, manganese valerate, manganese succinate, manganese salicylate and manganese phenolsulfonate; and manganese halides such as manganese chloride, manganese bromide and manganese iodide. Of these, the chlorides, sulfates, nitrates, bromides, formates, acetates, and benzoates are especially suitable.

Water soluble iron salts are compounds which yield $Fe^{+2}$ or $Fe^{+3}$ ions in water; they preferably have a solubility in water greater than 2 g/100 ml at 25° C and include, for example, ferrous chloride, ferrous perchlorate, ferrous bromide, ferrous nitrate, ferrous iodide, ferrous sulfate, and ferrous ammonium sulfate (the above compounds yield $Fe^{+2}$ ions), and ferric chloride, ferric perchlorate, ferric bromide, ferric nitrate, ferric iodide, ferric sulfate, and ferric ammonium sulfate (the above compounds yeild $Fe^{+3}$ ions).

Water soluble nickel salts are compounds which yield $Ni^{+2}$ ions in water; they preferably have a solubility in water greater than 2 g/100 ml at 25° C and include, for example, the inorganic salts, inorganic acid salts, organic acid salts, and complex salts of nickel. Specific examples of these compounds are nickel chloride, nickel sulfate, nickel nitrate, nickel bromide, nickel iodide, nickel perchlorate, nickel hypophosphite, nickel formate, nickel benzenesulfonate, hexammine nickel chloride, nickel ammonium chloride, nickel ammonium sulfate, $(NiCl_2[P(C_6H_5)_3]_2)$, $(NiP[C_3H_6As(CH_3)_2]_3(CN))^+$, $LiNiO_2$, $K_3(NiF_6)$, $K_2(NiF_6)$, $[(Ni[(CH_3)_2AsC_6H_4As(CH_3)_2]_2Cl_2]Cl$, nickel borate, nickel bromate, nickel citrate, nickel cyclohexanebutyrate, nickel cyclopentamethylene dithiocarbamate, nickel dibutyl dithiocarbamate, nickel dimethyl dithiocarbamate, ethylenediamine nickel sulfate, nickel acetate, nickel pentamethylene dithiocarbamate, nickel phosphite, nickel potassium cyanide, nickel potassium sulfate, nickel fluorosilicate, nickel tartrate, nickel tetrammine nitrate and nickel thiocyanate. Of these, the chlorides, sulfates, nitrates, bromides, iodides, perchlorates, formates, benzenesulfonates, diaquotetrammine nitrate salts, hexammine chlorides, and ammonium sulfates of nickel are especially suitable.

Water soluble zinc salts are compounds which yield $Zn^{+2}$ ions in water; they preferably have a water solubility greater than 2 g/100 ml at 25° C and include, for example, the inorganic salts, inorganic acid salts, organic acid salts, and complex salts of zinc. Specific examples of these zinc compounds are zinc chloride, zinc bromide, zinc iodide, zinc chlorate, zinc bromate, zinc chlorite, zinc perchlorate, zinc sulfate, zinc nitrate, zinc nitrite, zinc borate, zinc metaborate, basic zinc borate, zinc hexafluorosilicate, zinc hypophosphite, zinc glycerophosphate, zinc bichromate, zinc citrate, zinc thionate, zinc dithionate, zinc tetrathionate, zinc pentathionate, zinc thiocyanate, zinc benzoate, zinc acetate, zinc salicylate, zinc picrate, zinc permanganate, zinc hydrogen phosphate, zinc formate, zinc ethylsulfate and zinc phenolsulfonate. Of these, the chlorides, bromides, iodides, chlorates, perchlorates, sulfates, nitrates, formates, acetates, and benzoates are especially suitable.

Examples of the alkalis used in this invention include inorganic alkalis and organic alkalis, such as alkali metal hydroxides and/or carbonates, alkaline earth metal hydroxides, etc. Preferred alkali metals are lithium, sodium and potassium. A preferred alkaline earth metal is barium. Preferred organic alkali materials have a solubility of at least 2 g/100 ml at 25° C in water, and include monoamines, polyamines, aliphatic amines and aromatic amines. Specific examples of the alkali used in this invention include potassium hydroxide, sodium hydroxide or lithium hydroxide, sodium carbonate, potassium carbonate, ammonia water, monoethanolamine, or p-phenylenediamine, and mixtures thereof. These alkaline substances are used as a solution in water.

The total amount of the alkali is preferably such that the ($OH^-$) concentration of the slurry becomes at least 0.5N after the $Co^{+2}$ ion (with or without the other cation(s)) has been neutralized. If the amount is such as to give an ($OH^-$) concentration of less than 0.5, the addition of the alkali does not produce a satisfactory effect of increasing the coercive force (Hc) of the ferromagnetic iron oxide. Generally, the amount of alkali is within the range of from about 1.0 to about 3.0 N. If desired, mixtures of more than one salt from each of the above classes and mixtures of more than one alkali can be utilized; for instance, one could utilize a mixture of two or more zinc salts instead of one zinc salt, two or more cobalt salts, etc.).

For convenience of operation, the suspension of the ferromagnetic powder is advantageously heated after all of the reaction solutions have been added, but it may be heated from the outset. The heating temperature is desirably about 80 to about 150° C, and, most desirably, the reaction is carried out in the boiling state at 90° to 105° C.

If the temperatue is lower than 80° C, long periods of time are required to increase the coercive force of the ferromagnetic powder, which is commercially disadvantageous. If it is above 105° C, no merits are obtained in performing the reaction in a reactor at atmospheric pressure. It is, of course, possible, however, to heat the suspension of the ferromagnetic power at a temperature of as high as about 150° C using an autoclave. Pressure is not overly important in the present invention, but, of course, if the heating temperature is over 105° C, a pressure over one atmosphere is necessary.

Generally, heating will be conducted for more than about 30 minutes. Heating can also be used to remove excess alkali or, in order to remove excess alkali in the reaction mixture after reaction, it is washed with water until its pH becomes not more than about 9.5, preferably not more than 8.5. It is then dehydrated by, for example, filtration or centrifugal separation. The residue is then dried at a temperature of about 40° to 200° C. The drying time is not important, and can be freely selected so as to obtain the desired degree of drying.

The above process steps are applicable when the starting ferromagnetic iron oxide is meghemite ($\gamma$-$Fe_2O_3$). In the case of magnetite ($Fe_3O_4$) or Berthollide iron oxide, the final drying step must be carried out in an inert gas such as $N_2$ or an inert gas such as He, Ne or Ar. This is because magnetite and Berthollide iron oxide are likely to be oxidized by heat when heat dried in the air.

The above process steps thus afford ferromagnetic iron oxide containing Co, or both Co and at least one metal selected from Cr, Mn, Fe, Ni, and Zn.

Where the resulting ferromagnetic iron oxide is magnetite or Berthollide iron oxide, its degree of oxidation can be adjusted by further treating it in an oxidizing atmosphere, for example, as disclosed in Japanese Patent Publication Nos. 5,009/64 and 10,307/64.

The effect of the present invention is that by pretreating ferromagnetic iron oxide with a reducing agent, ferromagnetic iron oxide containing Co or both Co and another metal which has good magentic stability and high coercive force can be obtained. When the ferromagnetic iron oxide obtained by the process of this invention is used for magnetic recording, magnetic recording media having good characteristics can be provided.

In the process of this invention described hereinabove, heating at about 200° to 500° C as is carried out in conventional processes after drying (disclosed, for example, in Japanese Patent Publication No. 27,719/72, Japanese Patent Application (Laid Open) No. 119,196/74, and U.S. Pat. No. 3,725,126) is not required to obtain ferromagnetic iron oxides having a high coercive force. However, the coercive force thereof can be even further increased by performing such a heating.

The ferromagnetic iron oxide obtained by the process of the invention can be used in various applications. Especially when it is used for magnetic recording, products having good characteristics are obtained.

A ferromagnetic powder of this invention obtained in the above manner can, for example, be dispersed in a binder, which is coated using an organic solvent on a base (support) and dried to form a magnetic layer for use as a magnetic recording medium.

The methods of preparing magnetic coating compositions used in this invention are described in detail, e.g., in Japanese Patent Publication Nos. 186/68, 28,043/72, 28,045/72, 28,046/72, 28,048/72, and 31,445/72, and U.S. Pat. No. 3,943,012. The magnetic coating compositions described in the above specifications contain as main components a ferromagnetic powder, a binder and a solvent for coating, and, optionally, contain additives such as a dispersing agent, a lubricant, an abrasive and an antistatic agent.

Hitherto known thermoplastic resins, thermosetting resins, or mixtures thereof, can be used as binders for the ferromagnetic metal powder of the present invention.

Suitable thermoplastic resins are those resins which have a softening point of about 150° C or less, an average molecular weight of about 10,000 to 200,000, and a degree of polymerization on the order of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyster resin, a chlorovinyl ether-acrylate copolymer, an amino resin, various synthetic rubber based thermoplastic resins such as neoprene rubber, isoprene rubber, styrene-butadiene rubber, etc., and mixtures thereof.

Suitable examples of these resins which can be used are described in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, 27886/73, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, an urea resin, a melamine resin, an alkyl resin, a silicone resin, an acryl based reactive resin, an epoxy-polyamide resin, a mixture of a high molecular weight polyester resin and an isocyanate prepolymer, a mixture of a methacrylic acid copolymer and a diisocyanate prepolymer, a mixture of a polyester-polyol and a polyisocyanate, an ureaformaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28911/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromagnetic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

The magnetic recording layer may contain, in addition to the aforesaid binder and the ferromagnetic powders, additives such as a dispersing agent, a lubricant, an abrasive and an antistatic agent.

The dispersing agents used include aliphatic acids having 12 to 18 carbon atoms ($R_1COOH$ wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, carbon black, graphite, a carbon black-graft polymer, molybdenum disulfide, tungsten disulfide, aliphatic esters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (the carbon atoms of the monobasic aliphatic acid and the carbon atoms of the monohydric alcohol total 21 to 23), etc. These lubricants are added in an amount of 0.2 to 20 parts by weight per 100 parts by weight of the binder. These lubricants are described, e.g., in Japanese Patent Publication Nos. 23,889/68, 18482/73 and 24041/73, U.S. Pat. Nos. 3,470,021, 3,492,235, 3,497,411, 3,523,086, 3,625,760, 3,630,772, 3,634,253, 3,642,539, and 3,687,725, *IBM Technical Disclosure Bulletin*, Vol. 9, No. 7, page 779 (Dec. 1966), *ELEKTRONIK*, No. 12, page 380 (1961), etc.

The abrasives used include those which are generally used, such as fused alumina, silicon carbide, chromium oxide ($Cr_2O_3$), corundum, artificial corundum, diamond, artificial diamond, garnet and emery (main components: corundum and magnetite). The average particle diameter of these abrasives is 0.05 to 5 $\mu$, preferably 0.1 to 2 $\mu$. These abrasives are added in an amount of 7 to 20 parts by weight per 100 parts by weight of the binder. These abrasives are described in Japanese Patent Application No. 26,749/73, U.S. Pat. Nos. 3,007,807, 3,041,196, 3,293,066, 3,630,910 and 3,687,725, British Pat. No. 1,145,349, and West German Pat. No. 853,211.

Examples of the antistatic agent are electrically conductive powders such as graphite or carbon black. The amount of the antistatic agent, when used, is about 5 parts by weight per 100 parts by weight of the ferromagnetic powder.

These antistatic agents are described, for example, in Japanese Patent Publication Nos. 2613/65, 24881/72, 15440/73, and 3642/75, U.S. Pat. Nos. 2,804,401, 3,293,066, and 3,647,539, British Patent 793,520, and *IBM Technical Disclosure Bulletin*, Vol. 6, No. 12, page 4 (May 1964).

In order to disperse the ferromagnetic powder into the binder, conventional methods are utilized. For example, ball milling, vibratory milling, sand milling, colloid milling and combinations thereof can be used. In some cases, ultrasonic vibration can be jointly used therewith. Various types of kneaders can be used in performing the dispersion. Examples include a two-roll mill, a three-roll mill, a ball mill, a pebble mill, a trommel, a sand grinder, a Szegvari attritor, a hogh speed impeller, a high speed stone mill, a high speed impact mill, a disperser, a knearder, a high speed mixer, a homogenizer, and an ultrasonic dispersing apparatus.

Various useful techniques relating to kneading and dispersing are described in T.C. Patton, *Paint Flow and Pigment Dispersion*, 1964, John Wiley & Sons, and in U.S. Pat. Nos. 2,581,414 and 2,855,156.

Magnetic recording layers are formed by dissolving the above components in an organic solvent to make a coating composition and then coating the same on a support.

The thickness of the support used is conventional and is about 5 to 50 $\mu$m, preferably about 10 to 40 $\mu$m. The material used for the support includes polyesters such as polyethylene terephthalate and polyethylene-2,6-naphthlate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer. Descriptions of back coats are found, e.g., in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688, etc.

The supports may be in any shape such as a tape, sheet, card, disc or drum, and various materials can be used depending upon the shape desired and end use contemplated.

The aforesaid magnetic recording layer can be coated on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used. The details of these methods are described in *Coating Engineering*, pp. 253 to 277, Asakura Publisher (March 20, 1971).

The organic solvents which can be used for coating include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride carbon tetrachloride, chloroform, ethylene chlorohydrin and dichlorobenzene; and the like.

The magnetic layer coated on the support by the above method is dried after, if desired, the coating has been subjected to a treatment for orienting the magnetic powder in the layer, Suitable treatments for orienting the magnetic powder in the layer are disclosed in U.S. Pat. Nos. 1,949,840, 2,796,359, 3,001,891, 3,172,776, 3,416,949, 3,473,960 and 3,681,138; Japanese Pat. Publication Nos. 3427/1957, 28368/1964, 23624.1965, 23625/1965, 13181/1966, 13043/1973 and 39722/1973. If required, the magnetic layer can be subjected to a surface-smoothening treatment, or cut to the desired shape, to thereby form the magnetic recording material of this invention. Suitable surface-smoothening techniques are disclosed in U.S. Pat. Nos. 2,688,567, 2,998,325 and 3,783,023, and German Patent Application (OPI) No. 2,405,222.

In the above orienting treatment for the magnetic layer, the orienting magnetic field can be either an AC or DC magnetic field with a field strength of about 500 to 2,000 gauss. The drying temperatre can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 kg/cm, and the surface temperature of the metal roll is kept at about 35° to 150° C. The rate of the treatment is about 5 to 120 meter/min. When the pressure and temperature are below the lower limits of the above specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meter/min, the operating efficiency is low, and if the rate is above 120 meter/min, operation is difficult.

The most preferred process for the production of a magnetic recording medium disclosed above is the process disclosed in Japanese Patent Application (OPI) No. 41506/1975 (corresponding to U.S. patent application Ser. No. 498,337, filed on Aug. 19, 1974).

The following Examples specifically illustrate the present invention. In the following Examples, all processings were at room temperature and at atmospheric pressure, unless otherwise indicated.

EXAMPLE 1

200 g of Berthollide iron oxide (FeO$_x$, $x$ = 1.38; Fe$^{+3}$/Fe$^{+2}$=3/1; average particle length 0.5 μm; acicular ratio 8/1; coercive force (Hc) 397 Oe) was dispersed over a 7 hour period in 2 liters of water to form a suspension of the iron oxide. With stirring (stirring continued from adding the reducing agent to the completion of the reaction), 20 g of sodium borohydride was added, whereupon a gas was vigorously evolved. When the stirring was further continued, evolution of the gas stopped in about 1 minute.

The stirring was continued for an additional 5 hours. When the decomposition of the sodium borohydride was almost completely ended, an aqueous solution containing Co$^{+2}$ ions prepared by dissolving 20 g of CoSO$_4$.7H$_2$O in 200 ml of water was added, and the mixture was stirred for 30 minutes.

Then, an alkali solution prepared by dissolving 80 g of sodium hydroxide in 500 ml of water was slowly added over a period of 1 minute, and the mixture was stirred for 20 minutes. The total amount of water in the reaction mixture became 3 liters.

The reaction mixture was heated, with stirring, at 100° C and the reaction was continued at 100° C for 2 hours. After the reaction, the reaction mixture was washed with water until its pH became not more than 8.5. The precipitate was then separated by filtration, and dried at 60° C for 15 hours.

The coercive force of the resulting Co-containing Berthollide iron oxide was measured by a fluxmeter of the type designed for a Vibrating Sample Magnetometer (Model VSM-III, a product of Toei Kogyo Kabushiki Kaisha) in an external magnetic field of 5 KOe, and found to be 602 Oe. The product was designated Sample P1.

The degree of oxidation of the Berthollide iron oxide after pre-treatment with the reducing agent did not change to a measurable degree. The above product had a Co content of 2.78 atomic percent.

COMPARATIVE EXAMPLE 1-1

Berthollide iron oxide containing 2.78 atomic percent Co was prepared in the same way as in Example 1 except that 20 g of sodium borohydride was not added. Its coercive force (Hc) measured by the same method as in Example 1 was 559 Oe. The product was designed Sample C1-1.

COMPARATIVE EXAMPLE 1-2

200 g of Berthollide iron oxide (the same as that used in Example 1) was dispersed in 2 liters of water to prepare a suspension of the iron oxide. An aqueous solution prepared by dissolving 20 g of sodium borohydride, 20 g of CoSO$_4$.2H$_2$O, and 80 g of sodium hydroxide in 600 ml of water was added, and the reaction was performed at 100° C for 2 hours. After the reaction, the reaction mixture was washed with water until its pH became not more than 8.5. The precipitate was separated by filtration, and dried at 60° C for 15 hours. This processing is disclosed in Japanese Patent Application (Laid-Open) No. 87397/73.

The resulting Berthollide iron oxide containing 2.78 atomic percent of Co had a coercive force of 402 Oe. The product was designated Sample C1-2.

It can be seen from a comparison of Sample P1 with Sample C1-1 that the coercive force of ferromagnetic iron oxide increases by about 50 Oe by reducing its surface in advance with a reducing agent (sodium borohydride). It can also be appreciated from the results obtained with Sample C1-2 that in a system where cobalt ions and reducing agent exist together (that is, under conditions which reduce the cobalt ion), a high increase in coercive force cannot be obtained, and, therefore, the increase of the coercive force is not an effect obtainable merely by incorporating a reducing agent, but is an effect of the pretreatment of iron oxide with the reducing agent.

EXAMPLE 2

The reaction in Example 1 was repeated except that the amounts and the sequence of addition of cobalt sulfate and sodium hydroxide, and the reaction temperature, were changed as shown in Table 1. The step before the pre-treatment with the reducing agent and the washing and drying steps were the same as in Example 1. The reaction time was 2 hours. The products obtained were designated Samples P2, P3, P4, P5, P6 and P7. The Co content of the products is also shown in Table 1.

Table 1

| Sample | $CoSO_4 \cdot 7H_2O$ (g/200 ml of water) | NaOH (g/500ml of water) | Addition steps (*) | Reaction temperature (°C) | Co Content (atomic %) |
|---|---|---|---|---|---|
| P2 | 20 | 160 | Co→A→H | 80 | 2.78 |
| P3 | 20 | 80 | ½A→Co→½A→H | 100 | 2.78 |
| P4 | 20 | 80 | A→Co→H | 100 | 2.78 |
| P5 | 30 | 320 | Co→A→H | 100 | 4.16 |
| P6 | 30 | 80 | H→½A→Co→½A | 80 | 4.16 |
| P7 | 25 | 100 | ½A→Co→½A→H | 100 | 3.47 |

* The symbols have the following meanings.
Co: addition of an aqueous solution containing $Co^{+2}$ ions.
→: stirring for 20 minutes.
A: addition of aqueous solution of sodium hydroxide.
½A: addition in an amount half of A.
H: heating to the reaction temperature.

COMPARATIVE EXAMPLE 2

The reaction was carried out under the same conditions as in Example 2 except that the pre-treatment with a reducing agent was omitted (the same procedure as in Comparative Example 1-1). The process steps were the same as in Table 1. The resulting Co-containing Berthollide iron oxide products were designated Samples C2, C3, C4, C5, C6 and C7 and had the same Co content as in Samples P2, P3, P4, P5, P6 and P7, respectively.

The coercive forces of Samples obtained in Example 2 and Comparative Example 2 are shown in Table 2. The method of measurement was the same as in Example 1.

Table 2

| | Coercive force Hc (Oe) | | |
|---|---|---|---|
| Sample | Example 2 | Comparative Example 2 | Sample |
| P2 | 606 | 557 | C2 |
| P3 | 650 | 595 | C3 |
| P4 | 637 | 586 | C4 |
| P5 | 670 | 624 | C5 |
| P6 | 612 | 560 | C6 |
| P7 | 643 | 600 | C7 |

It can be seen from the above results that the Samples obtained in Example 2 has a coercive force about 40-60 Oe higher than those of the Samples obtained in Comparative Example 2, and the effect of increasing the coercive force by pre-treatment with reducing agents was confirmed.

EXAMPLE 3

200 g of Berthollide iron oxide (the same iron oxide as used in Example 1) was dispersed in 2 liters of water to form a suspension of the iron oxide. 20 g of each of the reducing agents shown in Table 3 was added as a 30 wt.% aqueous solution thereof, and the mixture was heated to 100° C and heated at this temperature for 2 hours. When the reducing agent of Sample P-11 was used (sodium hypophosphite), sodium hydroxide (pH adjusting agent) was added so that the pre-treatment of the iron oxide with the reducing agent was performed at a pH of 8; this increased the reducing power of the alkali solution. After the treatment with the reducing agent, and before adding the $Co^{+2}$ aqueous solution, unreacted reducing agent was removed from the suspension by decantation 5 times with 5 liters of water. The pre-treated iron oxide was then subjected to the same processing as in Example 1 to obtain Co-containing Berthollide iron oxides. The products were designated Samples P8, P9, P 10 and P 11. The coercive forces of these Samples are shown in Table 3. The coercive force of Sample Cl-1 obtained in Comparative Example 1-1 is also shown in Table 3. Samples P8, P9, P 10 and P 11 had a Co content of 2.78 atomic percent.

Table 3

| Sample | Reducing agent (20 g) | Coercive force Hc (Oe) |
|---|---|---|
| P8 | Sodium formate | 592 |
| P9 | Acetaldehyde | 613 |
| P10 | Hydrazine hydrochloride | 604 |
| P11 | Sodium hypophosphite | 588 |
| Cl-1 | — | 559 |

These results show that the increase of the coercive force was confirmed even when the pre-treatment was performed using reducing agents other than sodium borohydride.

EXAMPLE 4

The same procedure as in Example 1 was repeated except that the degree of oxidation (x) of the Berthollide iron oxide ($FeO_x$) used was changed. The products obtained were designated Samples P12, P13, P14 and P15. The degree of oxidation and the coercive force of the products are shown in Table 4. The data for Sample P1 (obtained in Example 1) are also shown. Samples P12, P13, P14 and P15 had a Co content of about 2.78 atomic percent.

COMPARATIVE EXAMPLE 3

Co-containing Berthollide iron oxide products were produced in the same way as in Comparative Example 1 without the pre-treatment with reducing agents using the same Berthollide iron oxide as used in Example 4 as a starting material. The products obtained were designated Samples Nos. 12, 13, 14 and 15. The degree of oxidation (x) and the coercive force of the products are shown in Table 4 together with the data of Example 4 and Comparative Example 1-1.

Samples C12, C13, C14 and 15 had a Co content of about 2.78 atomic percent.

Table 4

| | | Coercive force Hc (Oe) | | |
|---|---|---|---|---|
| Sample | Degree of oxidation | Example 4 | Comparative Example 3 | Sample |
| P12 | 1.45 | 500 | 450 | C12 |
| P13 | 1.42 | 549 | 489 | C13 |
| P14 | 1.40 | 589 | 534 | C14 |
| P1 | 1.38 | 602 | 559 | Cl-1 |
| P15 | 1.36 | 580 | 520 | C15 |

From the above results, it can be seen that the effect of the present invention is exhibited even when Berthollide iron oxides with different degrees of oxidation are used.

EXAMPLE 5

In the process shown in Example 1, an aqueous solution containing $Mn^{+2}$ ions ($MnSO_4.H_2O$ (20.9 g/400 ml water)) was simultaneously added with the addition of an aqueous solution containing $Co^{+2}$ ions ($CoSO_4.7H_2O$ (20 g/200 ml of water)). Other steps were the same as in Example 1. There was obtained Berthollide iron oxide containing Co and Mn. The product was designated Sample P16.

EXAMPLE 6

In Example 1, an aqueous solution containing $Co^{+2}$ ions ($CoSO_4.7H_2O$ (20 g/200 ml of water)) and an alkali solution (NaOH (80 g/500 ml of water)) were added. The mixture was heated to 100° C. Then, an aqueous solution containing Fe ions ($Fe_2(SO_4).7H_2O$ (25 g/500 ml of water)) was dropwise added at a rate of 4 ml/min. over the course of 2 hours (the reaction time). Other steps were the same as in Example 1. There was obtained Berthollide iron oxide containing Co and Fe. The product was designated Sample P17.

COMPARATIVE EXAMPLE 4

Berthollide iron oxide containing C. and Mn (Sample C16) and Berthollide iron oxide containing Co and Fe (Sample C17) were prepared in the same way as in Examples 5 and 6, respectively, without performing the pre-treatment with sodium borohydride.

The coercive forces of Samples P16, P17, C16 and C17 were measured in the same way as in Example 1, and the results are shown in Table 5.

Table 5

| Sample | Amount of metal added (atomic percent) | Coercive force Hc (Oe) Examples 5 and 6 | Comparative Example 4 | Sample |
|---|---|---|---|---|
| P16 | Co: 2.78 Mn: 4.82 | 602 | 540 | C16 |
| P17 | Co: 2.78 Fe: 4.18 | 664 | 611 | C17 |

The effect of the pre-treatment with reducing agents in accordance wtih the present invention was confirmed by the results of Examples 5 and 6 and Comparative Example 4 above.

EXAMPLE 7

Co-containing Berthollide iron oxides were prepared in the same way as in Example 1 except that the amount of sodium borohydride was changed as shown in Table 7. The products were designated Samples P18, P19, P20 and P21. The coercive forces of these Samples are shown in Table 6 together with those of Sample P1 (Example 1) and Sample C1-1 (Comparative Example 1).

Table 6

| Sample | Amount of sodium borohydride added (g) | Coercive force Hc (Oe) |
|---|---|---|
| C1-1 | — | 559 |
| P18 | 2 | 570 |
| P19 | 5 | 578 |
| P20 | 10 | 585 |
| P21 | 15 | 597 |
| P1 | 20 | 602 |

EXAMPLE 8

In the reaction shown in Example 1, the amount of $CoSO_4.7H_2O$ was changed as shown in Table 8; other steps and conditions were the same as in Example 1. Co-containing Berthollide iron oxides were thus prepared. The products were designated Samples P22 and P23. The coercive forces and Co contents of these Samples together with Sample C1-2 (Comparative Example 1-2), Sample P1 (Example 1) and Sample P5 (Example 2) are shown in Table 7. The method of measuring the coercive forces was the same as in Example 1.

Table 7

| Sample | Amount of $CoSO_4.7H_2O$ (g/200 ml of water) | Co content (atomic percent) based on Fe atoms | Coercive force Hc (Oe) |
|---|---|---|---|
| P22 | 11 | 1.5 | 550 |
| P23 | 15 | 2.0 | 573 |
| P1 | 20 | 2.78 | 602 |
| P5 | 30 | 3.9 | 670 |
| C1-2 | 20 | 2.78 | 402 |

The above results demonstrate that the amount of Co to be added can be smaller in the process of this invention than in conventional methods; this reduces the degree of decrease of the repeated reproduction output which is caused by pressure demagnetization occurring as a result of adding Co.

EXAMPLE 9

Magnetic tapes were produced using Samples P1 and C1-1 obtained in Example 1 and Comparative Example 1-1.

300 parts by weight of each of these Samples was thoroughly kneaded with the following ingredients using a ball mill.

| | parts by weight |
|---|---|
| Vinyl chloride/vinyl acetate (87/13 molar ratio) copolymer (molecular weight of about 50,000) | 40 |
| Epoxy resin (the condensation product of bisphenol A and epichlorohydrin; epoxy group content: 0.4 wt.%; molecular weight: about 470) | 30 |
| Silicone oil (polydimethylsiloxane) | 5 |
| Toluenesulfonic acid ethylamide | 7 |
| Ethyl acetate | 250 |
| Methyl ethyl ketone | 250 |

To the resulting composition was added 20 parts by weight of Desmodur L-75 (a 75% by weight ethyl acetate solution of a reaction product formed between 1 mole of 2,4-tolylene diisocyanate and 3 moles of trimethylol propane, trademark for a product of Bayer AG) and they were uniformly mixed and dispersed to provide a magnetic coating composition.

The coating composition was coated on a polyethylene terephthalate film of a thickness of 25 μm so that its thickness upon drying became 10 μm. The coated film was then oriented in a magnetic field of 1000 Oe, dried, and slit to a width of ½ inch (about 1.27 cm) to form a magnetic tape. Magnetic tape samples T'1 and TC1 were thus produced.

The two samples were cut to a length of 732 m (corresponding to C-60), and, using a video tape recorder (NV-3120 type VTR made by Matsushita Electric Industrial Co., Ltd. (Uniform I-type, color VTR designed for use of an open reel tape with a width of ½ inch)), signals of 5 MHz were recorded. The signals were reproduced by a bias current at which each of the samples exhibited maximum output, and the video sensitivity of the tape was measured. The video sensitivity of a video tape produced by using $CrO_2$ was taken as 0 dB, and the video sensitivities of the sampels were expressed in relative values. The results are shown in Table 8.

Table 8

| Sample No. | Video sensitivity (dB) |
|---|---|
| T1 | +1.5 |
| TC1 | +0.5 |

The above results demonstrate that video sensitivity was improved as a result of the increased coercive force.

The above examples confirmed that the pre-treatment with a reducing agent in accordance with this invention is effective to increase the coercive force of the resulting ferromagnetic iron oxide powder.

Although high coercive forces can be obtained in this invention without requiring heat-treatment at temperatures of as high as 300° to 500° C, the coercive force may, if desired, be controlled by performing this heat-treatment. Furthermore, when the ferromagnetic iron oxide in accordance with this invention is produced by performing the precipitation repeatedly, such results in the deposition of layers of selected ions. Hence, such ferromagnetic iron oxide would have utility in fields where new properties are required by controlling the diffusion of ions between the adjacent layers.

While the invention has been described in detail and with reference to specific embodiments thereof, it will be apparent to one skilled in the art that various changes and modifications can be made therein without departing from the spirit and scope thereof.

What is claimed is:

1. A process for producing a ferromagnetic iron oxide which comprises:
    treating a water or water-miscible organic solvent suspension of a ferromagnetic iron oxide with a reducing agent present in said suspension for a period of 3 minutes to 5 hours, removing any unoxidized reducing agent, adding an aqueous solution containing $Co^{+2}$ ions or $Co^{+2}$ ions and one or more other metal ions and an alkali solution to the suspension and heating; wherein:
    said reducing agent is used in an amount of 0.01 to 30 weight % based on the iron oxide and said reducing agent has a standard electrode potential of not greater than −0.4 V;
    said ferromagnetic iron oxide is maghemite, magnetite, $FeOx$ where $1.33 < x < 1.50$, or partially oxidized metallic iron;
    said $Co^{+2}$ ions or said $Co^{+2}$ ions and the other metal ions are present in an amount of 0.5 to 10 atomic % based on the amount of Fe present in the iron oxides;
    said other metal ions are selected from the group consisting of $Cr^{+3}$, $Cr^{+6}$, $Mn^{+2}$, $Fe^{+2}$, $Fe^{+3}$, $Ni^{+2}$ and $Zn^{+2}$, and when said other metal ions are present, the ratio of $Co^{+2}$ ions to the other metal ions is at least 1/3;
    said alkali is present in an amount such that the hydroxyl ion concentration after neutralizing the $Co^{+2}$ ions or $Co^{+2}$ and said other metal ions is at least 0.5 N;
    said heating is at 8°–150° C and; wherein the ferromagnetic iron oxide so produced has a higher coercive force than that obtained from said process without said treatment with said reducing agent.

2. The process of claim 1 wherein said reducing agent is selected from the group consisting of borohydride compounds, hypophosphorous acid, hypophosphorous acid salts, hydrazine compounds, formic acid, formic acid salts, aldehydes, and derivatives of these compounds.

3. The process of claim 2 wherein said reducing agent is used as a solution in water or a mixture of water and a water-miscible organic solvent.

4. The process of claim 1 wherin said $Co^{+2}$ ions are derived from a water-soluble cobalt salt, and said one or more other metal ions are derived from a water-soluble metal salt.

5. The process of claim 1 wherein the amount of $Co^{+2}$ ions or $Co^{+2}$ and said other metal ions is 0.8 to 5 atomic %.

6. The process of claim 1 wherein said alkali is an alkali hydroxide, an alkali carbonate, ammonium hydroxide, ammonia water, an aliphatic or aromatic amine, or a mixture thereof.

7. The process of claim 1, wherein the treatment with the reducing agent is at a temperature of from room temperature to about 100° C.

8. The process of claim 7, wherein the temperature of the system is raised to 90° to 105° C, after the addition of the cobalt ion containing solution and the alkali solution.

9. The process of claim 7 wherein the temperature of the system is raised to boiling after the addition of the cobalt ion containing solution and the alkali solution.

10. The process of claim 1 wherein the alkali solution is added after the aqueous solution containing $Co^{+2}$ ions or both $Co^{+2}$ ions and said other metal ions is added.

11. The process of claim 1, wherein the aqueous solution containing $Co^{+2}$ ions or both $Co^{+2}$ ions and said other metal ions is added after the alkali solution is added.

12. The process of claim 1, wherein the aqueous alkali solution is added in two equal portions, one before and one after the addition of the $Co^{+2}$ ions or $Co^{+2}$ ions and said other metal ions.

13. The process of claim 1 wherein said any excess reducing agent is removed by heating.

14. The process of claim 1 wherein said any excess reducing agent is removed by decantation.

* * * * *